(12) United States Patent
Kimura et al.

(10) Patent No.: US 8,652,338 B2
(45) Date of Patent: Feb. 18, 2014

(54) MAGNETIC RECORDING MEDIUM AND METHOD OF MANUFACTURING THE SAME

(71) Applicants: Kaori Kimura, Tokyo (JP); Yoshiyuki Kamata, Tokyo (JP); Satoshi Shirotori, Yokohama (JP); Tsuyoshi Onitsuka, Hino (JP)

(72) Inventors: Kaori Kimura, Tokyo (JP); Yoshiyuki Kamata, Tokyo (JP); Satoshi Shirotori, Yokohama (JP); Tsuyoshi Onitsuka, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/678,303

(22) Filed: Nov. 15, 2012

(65) Prior Publication Data

US 2013/0075358 A1 Mar. 28, 2013

Related U.S. Application Data

(62) Division of application No. 12/285,015, filed on Sep. 26, 2008, now Pat. No. 8,338,007.

(30) Foreign Application Priority Data

Sep. 26, 2007 (JP) .................. 2007-250092

(51) Int. Cl.
*B44C 1/22* (2006.01)
(52) U.S. Cl.
USPC ............. 216/22; 216/26; 216/41; 216/58; 216/75; 216/76; 438/725; 438/738; 438/742
(58) Field of Classification Search
None
See application file for complete search history.

(56) References Cited

U.S. PATENT DOCUMENTS

| | | |
|---|---|---|
| 3,627,330 A | 12/1971 | Dimitracopoulos |
| 4,396,479 A | 8/1983 | Jones |
| 4,599,135 A | 7/1986 | Tsunekawa et al. |
| 4,647,494 A | 3/1987 | Meyerson et al. |
| 4,662,985 A | 5/1987 | Yoshida et al. |
| 4,701,374 A | 10/1987 | Sagoi et al. |
| 4,935,278 A | 6/1990 | Krounbi et al. |
| 5,192,697 A | 3/1993 | Leong |
| 5,402,278 A | 3/1995 | Morita |
| 5,461,600 A | 10/1995 | Pohl |
| 5,516,031 A | 5/1996 | Nishikawa et al. |
| 5,535,069 A | 7/1996 | Chiao et al. |
| 5,766,718 A | 6/1998 | Matsuda et al. |
| 5,771,131 A | 6/1998 | Pirzadeh |
| 5,772,905 A | 6/1998 | Chou |
| 5,943,180 A | 8/1999 | Seo et al. |

(Continued)

FOREIGN PATENT DOCUMENTS

| | | |
|---|---|---|
| CN | 1360304 | 7/2002 |
| CN | 1558399 | 12/2004 |

(Continued)

OTHER PUBLICATIONS

Hattori et al., "Fabrication of Discrete Track Perpendicular Media for High Recording Density", IEEE Transactions on Magnetics, vol. 40, No. 40, Jul. 2004, pp. 2510-2515.

(Continued)

*Primary Examiner* — Kevin Bernatz
(74) *Attorney, Agent, or Firm* — Nixon & Vanderhye, P.C.

(57) ABSTRACT

A magnetic recording medium a magnetic recording medium includes a soft magnetic layer formed on a substrate, magnetic patterns made of a protruded ferromagnetic layer separated from each other on the soft magnetic layer, and a nonmagnetic layer formed between the magnetic patterns, a nitrogen concentration therein being higher on a surface side than on a substrate side.

9 Claims, 6 Drawing Sheets

(56) References Cited

U.S. PATENT DOCUMENTS

| | | |
|---|---|---|
| 5,956,216 A | 9/1999 | Chou |
| 6,055,139 A | 4/2000 | Ohtsuka et al. |
| 6,095,160 A | 8/2000 | Chu |
| 6,139,936 A | 10/2000 | Weiss |
| 6,153,281 A | 11/2000 | Meyer et al. |
| 6,168,845 B1 | 1/2001 | Fontana, Jr. et al. |
| 6,238,582 B1 | 5/2001 | Williams et al. |
| 6,254,966 B1 | 7/2001 | Kondo |
| 6,324,032 B1 | 11/2001 | Ohtsuka et al. |
| 6,331,364 B1 | 12/2001 | Baglin et al. |
| 6,365,012 B1 | 4/2002 | Sato et al. |
| 6,426,845 B1 | 7/2002 | Sacks et al. |
| 6,469,852 B1 | 10/2002 | Nakagawa |
| 6,564,445 B1 | 5/2003 | Hashimoto et al. |
| 6,602,620 B1 | 8/2003 | Kikitsu et al. |
| 6,613,459 B1 | 9/2003 | Saito et al. |
| 6,641,935 B1 | 11/2003 | Li et al. |
| 6,689,495 B1 | 2/2004 | Sato et al. |
| 6,751,035 B1 | 6/2004 | Belser |
| 6,753,043 B1 | 6/2004 | Kuo et al. |
| 6,753,130 B1 | 6/2004 | Liu et al. |
| 6,841,220 B2 | 1/2005 | Onoe et al. |
| 6,875,492 B1 | 4/2005 | Pirzada et al. |
| 6,969,447 B2 | 11/2005 | Pocker et al. |
| 6,999,279 B2 | 2/2006 | Lundstrom |
| 7,010,848 B2 | 3/2006 | Li et al. |
| 7,112,376 B2 | 9/2006 | Moriwaki et al. |
| 7,147,790 B2 | 12/2006 | Wachenschwanz et al. |
| 7,186,348 B2 | 3/2007 | Chen et al. |
| 7,209,413 B2 | 4/2007 | Van Der et al. |
| 7,225,528 B2 | 6/2007 | Suwa et al. |
| 7,273,563 B2 | 9/2007 | Hattori et al. |
| 7,300,595 B2 | 11/2007 | Suwa et al. |
| 7,323,258 B2 | 1/2008 | Kamata et al. |
| 7,345,838 B2 | 3/2008 | Sakurai et al. |
| 7,388,725 B2 | 6/2008 | Sakurai et al. |
| 7,488,429 B2 | 2/2009 | Okawa et al. |
| 7,572,528 B2 | 8/2009 | Yamamoto et al. |
| 7,625,645 B2 | 12/2009 | Kikitsu |
| 7,662,264 B2 | 2/2010 | Shirotori et al. |
| 7,686,972 B2 | 3/2010 | Hieda et al. |
| 7,760,467 B2 | 7/2010 | Kimura et al. |
| 2001/0048566 A1 | 12/2001 | Hirano et al. |
| 2002/0039264 A1 | 4/2002 | Ohsawa et al. |
| 2002/0081461 A1 | 6/2002 | Nishikawa et al. |
| 2002/0142192 A1 | 10/2002 | Kamata et al. |
| 2002/0182443 A1 | 12/2002 | Ohkubo |
| 2003/0035973 A1 | 2/2003 | Trindade et al. |
| 2003/0038106 A1 | 2/2003 | Covington et al. |
| 2004/0050480 A1 | 3/2004 | Angelo et al. |
| 2004/0091748 A1 | 5/2004 | Kamata et al. |
| 2004/0166372 A1 | 8/2004 | Haginoya et al. |
| 2004/0170871 A1 | 9/2004 | Pocker et al. |
| 2004/0191577 A1 | 9/2004 | Suwa et al. |
| 2004/0247945 A1 | 12/2004 | Chen et al. |
| 2004/0253817 A1 | 12/2004 | Imada et al. |
| 2004/0257687 A1 | 12/2004 | Ishida et al. |
| 2005/0045583 A1 | 3/2005 | Fujita et al. |
| 2005/0052986 A1 | 3/2005 | Morita et al. |
| 2005/0069732 A1 | 3/2005 | Kamata et al. |
| 2005/0086795 A1 | 4/2005 | Suwa et al. |
| 2005/0117253 A1 | 6/2005 | Moriya et al. |
| 2005/0186450 A1 | 8/2005 | Takenoiri et al. |
| 2005/0219730 A1 | 10/2005 | Sakurai et al. |
| 2005/0219744 A1 | 10/2005 | Feldbaum et al. |
| 2005/0231856 A1 | 10/2005 | Kao et al. |
| 2005/0233176 A1 | 10/2005 | Takai et al. |
| 2005/0271902 A1 | 12/2005 | Nakamura et al. |
| 2005/0282038 A1 | 12/2005 | Yamamoto et al. |
| 2006/0012913 A1 | 1/2006 | Nakamura et al. |
| 2006/0014053 A1 | 1/2006 | Asakura et al. |
| 2006/0023329 A1 | 2/2006 | Tagami |
| 2006/0028750 A1 | 2/2006 | Sakurai et al. |
| 2006/0063042 A1 | 3/2006 | Takai et al. |
| 2006/0065136 A1 | 3/2006 | Takahashi et al. |
| 2006/0076509 A1 | 4/2006 | Okino et al. |
| 2006/0124585 A1 | 6/2006 | Suwa et al. |
| 2006/0132953 A1 | 6/2006 | Asakura et al. |
| 2006/0215306 A1 | 9/2006 | Ehrlich et al. |
| 2006/0222897 A1 | 10/2006 | Kimata et al. |
| 2006/0222901 A1 | 10/2006 | Inamura et al. |
| 2006/0269796 A1 | 11/2006 | Hyodo |
| 2006/0280861 A1 | 12/2006 | Shirotori et al. |
| 2006/0289382 A1 | 12/2006 | Kikitsu et al. |
| 2007/0000861 A1 | 1/2007 | Kamata et al. |
| 2007/0003793 A1 | 1/2007 | Sakurai et al. |
| 2007/0003798 A1 | 1/2007 | Naito et al. |
| 2007/0053107 A1 | 3/2007 | Kimura et al. |
| 2007/0068797 A1 | 3/2007 | Jayasekara |
| 2007/0070547 A1 | 3/2007 | Kamata et al. |
| 2007/0190365 A1 | 8/2007 | Kodama et al. |
| 2007/0207263 A1 | 9/2007 | Heida et al. |
| 2007/0224339 A1 | 9/2007 | Kimata et al. |
| 2007/0245545 A1 | 10/2007 | Pentek et al. |
| 2007/0281078 A1 | 12/2007 | Kikitsu |
| 2008/0040914 A1 | 2/2008 | Kao et al. |
| 2008/0117544 A1 | 5/2008 | Sakurai et al. |
| 2008/0241595 A1 | 10/2008 | Kimura et al. |

FOREIGN PATENT DOCUMENTS

| | | |
|---|---|---|
| CN | 1612225 | 5/2005 |
| CN | 1637870 | 7/2005 |
| EP | 0 339 813 | 11/1989 |
| EP | 0 339 851 | 11/1989 |
| EP | 0 183 427 | 1/1990 |
| EP | 0 459 265 | 12/1991 |
| EP | 0 468 778 | 1/1992 |
| EP | 0 538 887 | 4/1993 |
| EP | 1463038 | 12/2004 |
| JP | 58-118028 | 7/1983 |
| JP | 59-096643 | 6/1984 |
| JP | 62-232720 | 10/1987 |
| JP | 62-256225 | 11/1987 |
| JP | 02-232816 | 9/1990 |
| JP | 02-301018 | 12/1990 |
| JP | 03-060120 | 3/1991 |
| JP | 03-142707 | 6/1991 |
| JP | 04-001922 | 1/1992 |
| JP | 04-113515 | 4/1992 |
| JP | 05-089452 | 4/1993 |
| JP | 05-258291 | 10/1993 |
| JP | 06-028650 | 2/1994 |
| JP | 06-036263 | 2/1994 |
| JP | 06-076278 | 3/1994 |
| JP | 06-120520 | 4/1994 |
| JP | 06-139567 | 5/1994 |
| JP | 06-244150 | 9/1994 |
| JP | 06-301969 | 10/1994 |
| JP | 07-085406 | 3/1995 |
| JP | 07-153047 | 6/1995 |
| JP | 07-221441 | 8/1995 |
| JP | 08-069614 | 3/1996 |
| JP | 08-115519 | 5/1996 |
| JP | 08-241512 | 9/1996 |
| JP | 08-255340 | 10/1996 |
| JP | 09-097419 | 4/1997 |
| JP | 09-245345 | 9/1997 |
| JP | 10-177631 | 6/1998 |
| JP | 10-209128 | 8/1998 |
| JP | 10-334460 | 12/1998 |
| JP | 11-039633 | 2/1999 |
| JP | 11-161943 | 6/1999 |
| JP | 11-161944 | 6/1999 |
| JP | 2929899 | 8/1999 |
| JP | 11-265878 | 9/1999 |
| JP | 11-273059 | 10/1999 |
| JP | 11-274152 | 10/1999 |
| JP | 11-348048 | 12/1999 |
| JP | 2000-211082 | 8/2000 |
| JP | 2000-269330 | 9/2000 |
| JP | 2000-306227 | 11/2000 |
| JP | 2001-043526 | 2/2001 |
| JP | 2001-273682 | 10/2001 |

(56) References Cited

FOREIGN PATENT DOCUMENTS

| | | |
|---|---|---|
| JP | 3271406 | 1/2002 |
| JP | 2002-288813 | 10/2002 |
| JP | 2003-016621 | 1/2003 |
| JP | 2003-100609 | 4/2003 |
| JP | 2003-109213 | 4/2003 |
| JP | 2003-155365 | 5/2003 |
| JP | 2004-164692 | 6/2004 |
| JP | 2004-234826 | 8/2004 |
| JP | 2004-288250 | 10/2004 |
| JP | 2004-295989 | 10/2004 |
| JP | 2004-295991 | 10/2004 |
| JP | 3576220 | 10/2004 |
| JP | 2005-011459 | 1/2005 |
| JP | 2005-050468 | 2/2005 |
| JP | 2005-056535 | 3/2005 |
| JP | 2005-120421 | 5/2005 |
| JP | 2005-135455 | 5/2005 |
| JP | 3686067 | 6/2005 |
| JP | 2005-196885 | 7/2005 |
| JP | 2005-243086 | 9/2005 |
| JP | 2005-243131 | 9/2005 |
| JP | 2005-276325 | 10/2005 |
| JP | 2005-293633 | 10/2005 |
| JP | 2006-031790 | 2/2006 |
| JP | 2006-048769 | 2/2006 |
| JP | 2006-048861 | 2/2006 |
| JP | 2006-092659 | 4/2006 |
| JP | 2006-120222 | 5/2006 |
| JP | 2006-127590 | 5/2006 |
| JP | 2006-309879 | 11/2006 |
| JP | 2006-318648 | 11/2006 |
| JP | 2006-331578 | 12/2006 |
| JP | 2007-066475 | 3/2007 |
| JP | 2007-220203 | 8/2007 |
| WO | 02/23538 | 3/2002 |

OTHER PUBLICATIONS

Kimura et al., U.S. Appl. No. 12/076,949, filed Mar. 25, 2008.
Kikutsu et al., U.S. Appl. No. 11/806,229, filed May 30, 2007.
Kamata et al., U.S. Appl. No. 11/723,845, filed Mar. 22, 2007.
Shirotori et al., U.S. Appl. No. 11/406,502, filed Apr. 19, 2006.
Kamata et al., U.S. Appl. No. 11/371,901, filed Mar. 10, 2006.
Machine Translation of JP2006-120222-A (JP ref. pub. Date May 11, 2006).
Office Action in Japanese Patent Application No. 2007-250092, dated Jun. 2, 2009, and English-language translation.

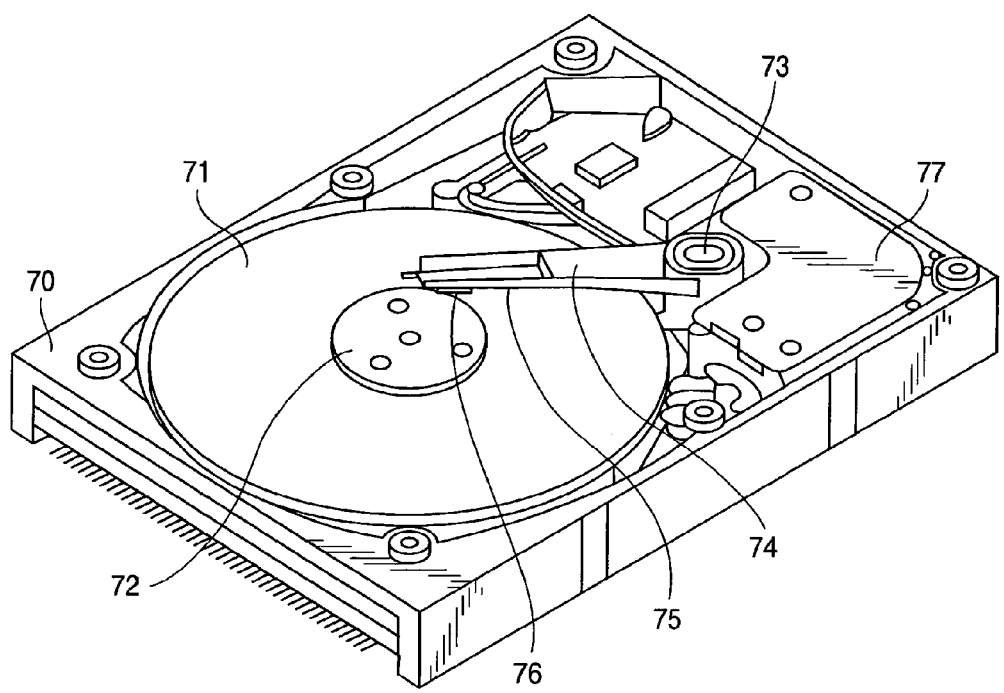
F I G. 5

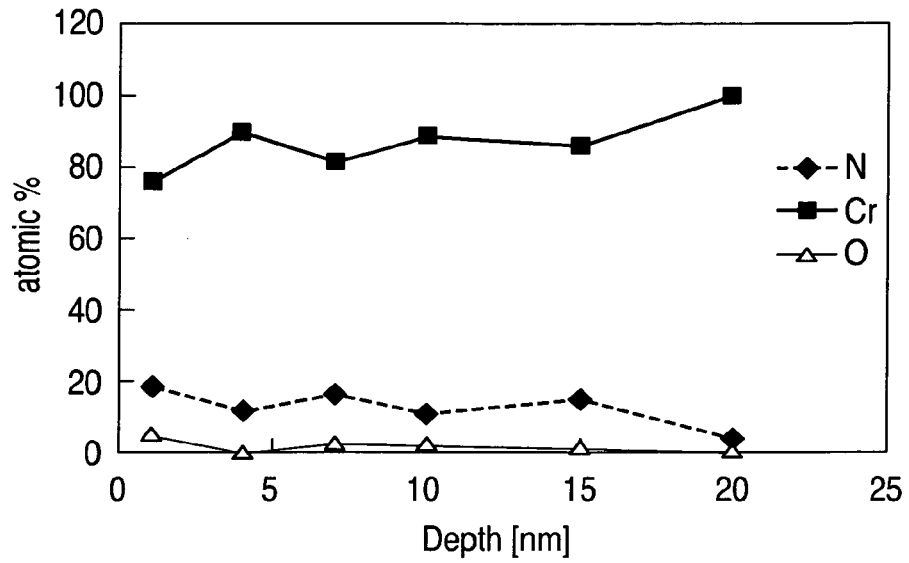
F I G. 6
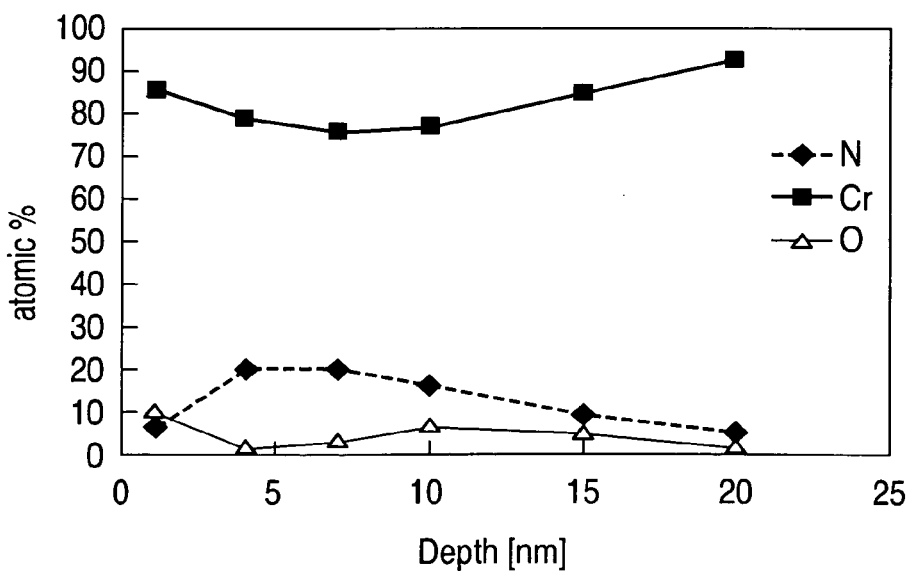
F I G. 7

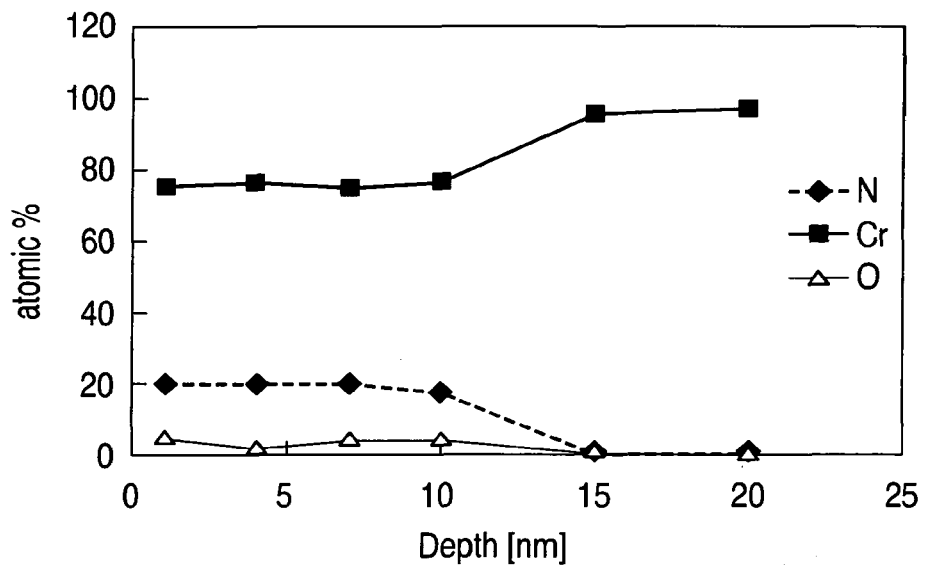
F I G. 8
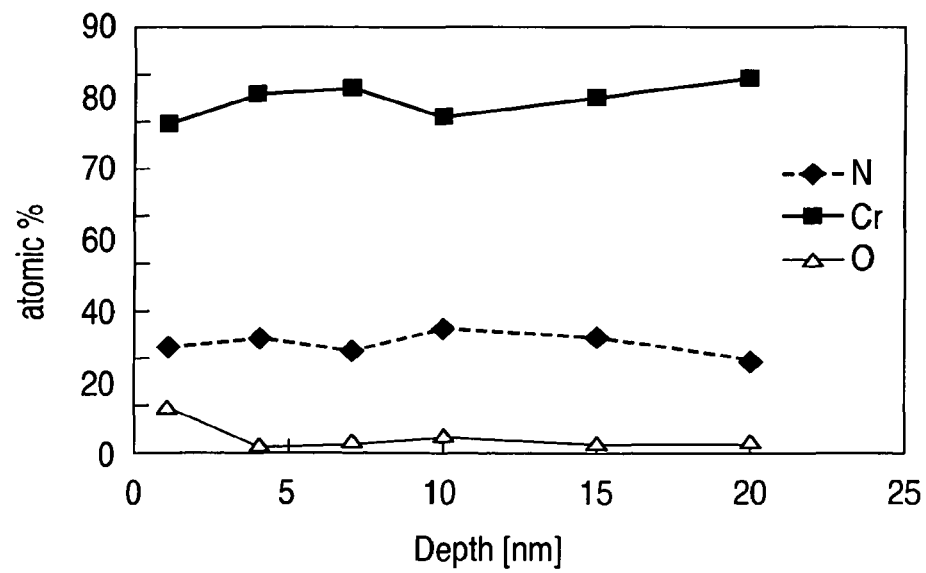
F I G. 9

MAGNETIC RECORDING MEDIUM AND METHOD OF MANUFACTURING THE SAME

CROSS-REFERENCE TO RELATED APPLICATIONS

This application is a divisional of U.S. patent application Ser. No. 12/285,015 filed Sep. 26, 2008, which is based upon and claims the benefit of priority from prior Japanese Patent Application No. 2007-250092, filed Sep. 26, 2007, the entire contents of each of which are incorporated herein by reference.

BACKGROUND OF THE INVENTION

1. Field of the Invention

The present invention relates to a magnetic recording medium capable of recording at high density and a method of manufacturing the magnetic recording medium.

2. Description of the Related Art

In the information-oriented society in recent years, the amount of data that needs to be stored in a recording medium has been continually increasing. To keep up with the increase in amount of data, there has been a demand for a recording medium and a recording apparatus with a dramatically high recording density. As regards a hard disk for which there is an increasing demand as a high-capacity and inexpensive magnetic recording medium, it is predicted that a recording density of one terabits per square inch or more, which is about ten times higher than the current recording density, will be required several years after.

In an existing magnetic recording medium used in a hard disk, one bit is recorded in a specific region of a thin film made of polycrystals of fine magnetic grains. To raise the recording capacity of the magnetic recording medium, therefore, the recording density must be increased. For this purpose, it is effective to reduce a recording mark size usable in recording per bit. If, however, the recording mark size is simply reduced, effect of recording noise caused by the shape of fine magnetic grains cannot be neglected. Instead, if the fine magnetic grains are further reduced in size, it is impossible to maintain the data recorded in fine magnetic grains at an ordinary temperature due to a problem of thermal fluctuation.

To avoid these problems, it is proposed to use a patterned medium in which dots of recording material are separated by a non-recording material in advance so as to perform read and write using a single recording dot as a single recording cell (see U.S. Pat. No. 5,956,216).

Also, in the magnetic recording medium incorporated into a hard disk drive (HDD), there is an increasing problem of disturbance of enhancement of track density due to interference between adjacent tracks. In particular, a serious technical subject is reduction of write blurring due to fringe effect of magnetic fields from a write head. A discrete track recording-type patterned medium (DTR medium) in which recording tracks are physically separated is capable of reducing a side erase phenomenon of erasing data of an adjacent track in writing or a side read phenomenon of reading out data of an adjacent track in reading, and is capable of enhancing the track density. Therefore, the DTR medium is expected as a magnetic recording medium capable of providing a high recording density (see JP-A-7-85406). It should be noted that, because the DTR medium is a form of the patterned medium, the term "patterned medium" herein includes a bit patterned medium and a DTR medium.

In the DTR medium or bit patterned medium of a type in which recording tracks or recording cells are physically separated, it is important to fill recesses between magnetic patterns with a nonmagnetic material to flatten the surface of the medium in terms of flying stability of a head. Particularly, processes of filling with a metal and flattening of the metal reduce dust generation during sputtering and give sufficient strength against impact. However, when a pure metal such as Cr is used as the filling material, particles of tens of nanometers to hundreds of nanometers in size are formed on the surface of the medium, bringing about increase in surface roughness (Ra).

Also, the metal film is etched on the edge surface of the substrate during processed of filling and flattening, giving rise to a problem that electric conduction is not achieved on the edge surface of the substrate. For this reason, diamond-like carbon (DLC) which will be deposited by chemical vapor deposition (CVD) as a protective film for the medium can not be used. It is considered to use carbon nitride instead of DLC, but carbon nitride has a poor adhesion to the filling material made of a common metal.

BRIEF SUMMARY OF THE INVENTION

According to an aspect of the present invention, there is provided a magnetic recording medium a magnetic recording medium comprising:
a soft magnetic layer formed on a substrate; magnetic patterns made of a protruded ferromagnetic layer separated from each other on the soft magnetic layer; and a nonmagnetic layer formed between the magnetic patterns, the nonmagnetic layer having a nitrogen concentration higher on a surface side than on a substrate side.

According to another aspect of the present invention, there is provided a method of manufacturing a magnetic recording medium comprising: depositing a soft magnetic layer on a substrate; depositing a ferromagnetic layer on the soft magnetic layer, followed by patterning the ferromagnetic layer to form magnetic patterns separated from each other; and forming a nonmagnetic layer between the magnetic patterns, the nonmagnetic layer having a nitrogen concentration higher on a surface side than on a substrate side.

BRIEF DESCRIPTION OF THE SEVERAL VIEWS OF THE DRAWING

FIG. 5 is a perspective view of a magnetic recording apparatus according to an embodiment of the present invention;

FIG. 6 is a graph showing the result of the compositional analysis of a filled layer of a magnetic recording medium in Example 1;

FIG. 7 is a graph showing the result of the compositional analysis of a filled layer of a magnetic recording medium in Comparative Example 1;

FIG. 8 is a graph showing the result of the compositional analysis of a filled layer of a magnetic recording medium in Example 3; and FIG. 9 is a graph showing the result of the compositional analysis of a filled layer of a magnetic recording medium in Comparative Example 3.

DETAILED DESCRIPTION OF THE INVENTION

Embodiments of the present invention will be described with reference to the drawings.

Figure 1:
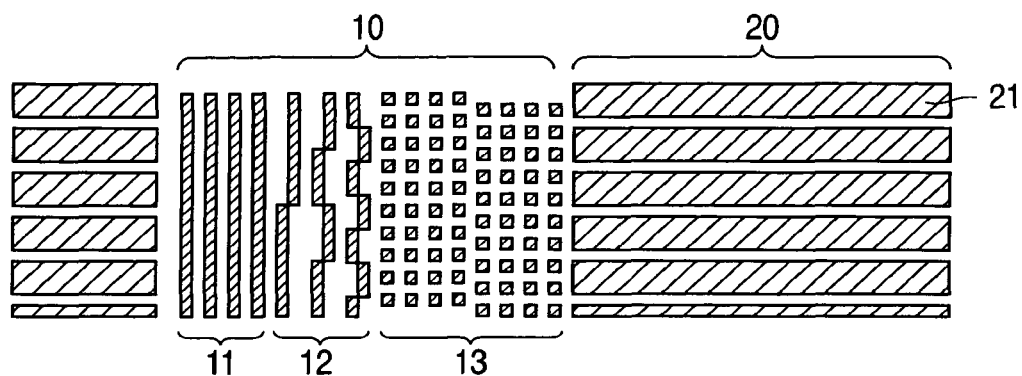
FIG. 1 is a plan view of a discrete track medium.

FIG. 1 shows a plan view of a discrete track recording medium (DTR medium) along the circumferential direction. As shown in FIG. 1, servo zones 10 and data zones 20 are alternately formed along the circumferential direction of the medium. The servo zone 10 includes a preamble section 11, an address section 12 and a burst section 13. The data zone 20 includes discrete tracks 21.

Figure 2:
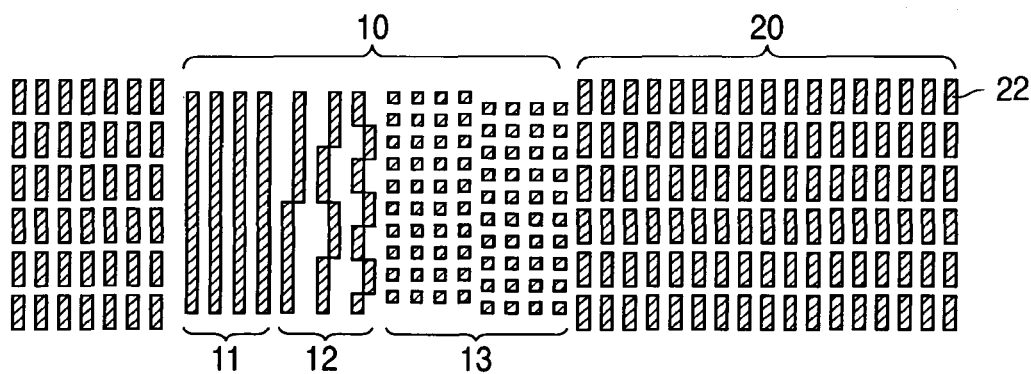
FIG. 2 is a plan view of a bit patterned medium.

FIG. 2 shows a plan view of a bit patterned medium along the circumferential direction. In the data zones 20 in FIG. 2, magnetic dots 22 are formed in which a ferromagnetic recording layer is physically separated not only in the cross track direction but also in the down track direction.

A method of manufacturing a magnetic recording medium according to an embodiment of the present invention will be schematically described with reference to the FIGS. 3A to 3G.

Figure 3A:
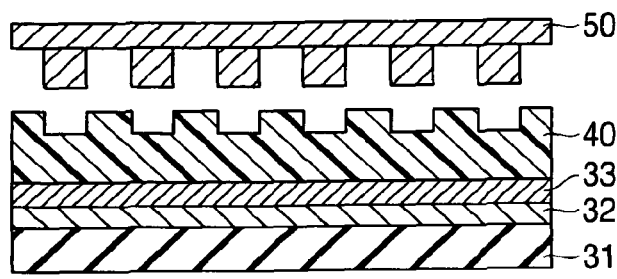
FIGS. 3A to 3G are cross-sectional views showing a method of manufacturing a magnetic recording medium according to an embodiment of the present invention.

As shown in FIG. 3A, a soft magnetic layer 32 and a ferromagnetic layer 33 are formed on a nonmagnetic substrate 31. In this stage, a protective layer made of a metal or inorganic compound may be formed on the ferromagnetic layer 33. The surface of the medium is coated with a resist 40 by spin coating. As the resist, a general novolac type photoresist or silica type resist such as spin-on glass (SOG) or HSQ may be used. On the other hand, a stamper 50 is prepared on which patterns of recording tracks and servo data are formed corresponding to the patterns shown in FIG. 1 or 2. Next, the stamper 50 is used to perform imprinting. The substrate 31 and the stamper 50 are mounted on the bottom plate of a die set with the patterned surface of the stamper 50 faced to the resist 40 of the substrate 31, and sandwich the substrate 31 and the stamper 50 between the bottom plate and top plate of the die set. Then, the substrate is subjected to pressing under a pressure of 2000 bar for 60 seconds to transfer the patterns of the stamper 50 to the resist 40.

Here, if the initial thickness of the resist is about 130 nm, the height of the protrusions of the patterns formed by imprinting is 60 to 70 nm and the thickness of the residues left on the bottoms of the recesses is about 70 nm. The retention time (60 seconds) for the pressing corresponds to sufficient time to migrate the resist to be removed. If a fluorine type releasing agent is applied to the stamper 50 or a film of diamond-like carbon (DLC) blended with fluorine is deposited on the stamper 50, the stamper can be well peeled off from the resist.

Figure 3B:
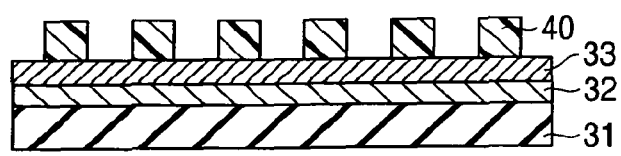

As shown in FIG. 3B, the resist residues in the recesses are removed to expose the ferromagnetic layer 33. When a common photoresist is used as the resist 40, the resist residues in the recesses is removed by oxygen gas RIE (reactive ion etching) to expose the ferromagnetic layer 33. When SOG is used as the resist 40, the resist residues are removed with $CF_4$ gas. As the plasma source, ICP (inductively coupled plasma) capable of producing a high-density plasma under a low pressure is preferable. However, an ECR (electron cyclotron resonance) plasma or general parallel plate type RIE apparatus may be used.

Figure 3C:
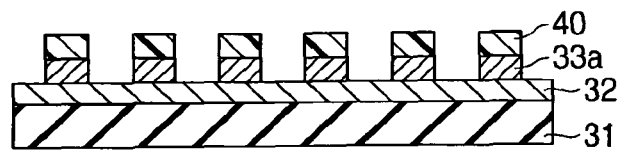

As shown in FIG. 3C, the ferromagnetic layer 33 is processed using the resist patterns as etching masks to form magnetic patterns 33a. For the processing of the ferromagnetic layer, etching using an Ar ion beam (Ar ion milling) is preferable. However, RIE using Cl gas or $CO—NH_3$ mixed gas may be adopted. In the case of RIE using $CO—NH_3$ mixed gas, a hard mask such as Ti, Ta or W is used as the etching mask. When RIE is used, the protruded magnetic patterns 33a can be formed with good rectangularity. When the ferromagnetic layer is processed Ar ion milling capable of etching any material, for example, the acceleration voltage is set to 400 V and the incident angle of ions is varied between 30° and 70°. In milling using an ECR ion gun, by carrying etching with a static opposition type (incident angle of ions: 90°), the protruded magnetic patterns 33a can be formed with good rectangularity.

Figure 3D:
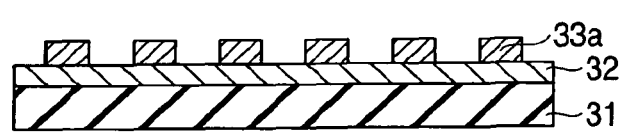

As shown in FIG. 3D, the resist patterns are peeled off. When a common photoresist is used as the resist, it can be easily peeled off by carrying out oxygen plasma treatment. If a carbon protective layer is formed on the surface of the ferromagnetic layer 33, the carbon protective layer is also peeled off at this time. When SOG is used as the resist, the resist is peeled off by RIE with fluorine-containing gas. As the fluorine-containing gas, $CF_4$ or $SF_6$ is desirable. In this case, it is preferable to carry out washing with water after the resist is peeled off because the fluorine-containing gas reacts with water in the atmosphere to produce acids such as HF and $H_2SO_4$.

Figure 3E:
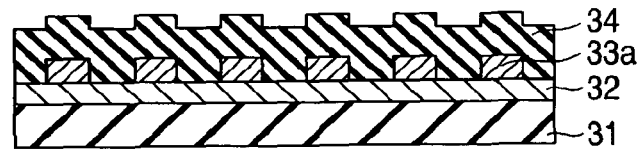
Figure 3F:
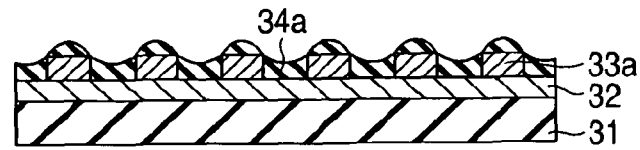
Figure 3G:
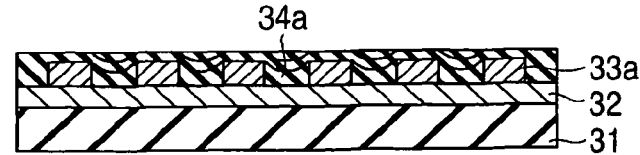

A nonmagnetic layer 34 is deposited on the entire surface as shown in FIG. 3E and then the nonmagnetic layer 34 is etched back as shown in FIG. 3F to form a filled layer 34a in the recesses between the magnetic patterns 33a. In the embodiment of the present invention, the nitrogen concentration in the filled layer 34a is higher on the surface side than on the substrate side. Here, "substrate side" of the filled layer 34a means the boundary region of the filled layer 34a in contact with the underlying layer, and "surface side" of the filled layer 34a means the boundary region of the filled layer 34a in contact with the protective layer. When the filled layer made of a nitride is in direct contact with the magnetic patterns 33a, the magnetic patterns 33a are deteriorated by nitrogen. In order to evade such deterioration, the nitrogen concentration in the filled layer 34a is designed to be lower in the substrate side. The filled layer 34a includes a nitride of a single element, for example, a metal such as Ti, V, Cr, Ni, Cu, Ga, Y, Zr, Nb, Mo, Hf, Ta, W or Al or an inorganic material such as C or Si, an alloy or compound of these elements. These elements each have a property to be nitrided. As shown in FIG. 3G, the deposition and etchback of the nonmagnetic layer 34 are repeated two or more times to form a filled layer 34a having a multilayer structure and flattened surface in the recesses between the magnetic patterns 33a.

The details of the method of forming the filled layer in which the nitrogen concentration is higher on the surface side than on the substrate side will be described later. Here, the processes shown in FIGS. 3E to 3G will be schematically described.

In FIG. 3E, the nonmagnetic layer 34 is formed by bias sputtering or usual sputtering. The bias sputtering is a method in which a bias is applied to the substrate to perform sputtering and makes easy to carry out filling in the recesses. Because this bias sputtering has the problem that the substrate is easily dissolved by biasing the substrate and sputtering dusts are easily produced, it is desirable to use usual sputtering.

In FIG. 3F, the etchback is terminated just before the magnetic patterns 33a are exposed. In this etchback process, it is desirable to adopt the etching under perpendicular incidence using an ECR ion gun. When a silicon-based filling material such as SiON is used, RIE using fluorine-containing gas may be adopted. Also, Ar ion milling may be used.

In FIG. 3G, the nonmagnetic layer is allowed to remain as a filling material on the magnetic patterns 33a after the etchback and may be utilized as a protective layer, or the filling material and other material may be used to form a protective layer after the etchback. As the material of the protective layer, diamond-like carbon (DLC) is frequently used because it is superior in hardness. In order to improve coverage on the protrusions and recesses to form a DLC film containing much $sp^3$ bonded carbon, the film is preferably formed by CVD. However, if electrical conduction is not achieved on the surface of the medium, it is difficult to adopt CVD. In light of this, in the embodiment of the present invention, it is preferable to use a protective film containing carbon nitride which can be formed by sputtering and has good adhesion to the filled layer.

As to the thickness of the protective layer (including the thickness of the filling material), the coverage is impaired when the thickness is less than 1 nm, and the magnetic spacing between the read/write head and the medium is increased when the thickness is more than 10 nm, leading to deterioration in SNR. Therefore, the thickness less than 1 nm or more than 10 nm is undesirable.

A lubricating layer may be formed on the protective layer. As the lubricant to be used in this lubricating layer, currently known materials, for example, a perfluoropolyether, alcohol fluoride, fluorinated carboxylic acid or the like may be used.

Next, the process for forming a nonmagnetic layer in which the nitrogen concentration is higher on the surface side than on the substrate side in the embodiments of the present invention will be described. In the embodiments of the present invention, a process involving (1) surface nitriding treatment, (2) etchback in nitrogen-containing gas, or (3) depositions of a non-nitride layer and a nitride layer is used. These processes will be described in more detail.

(1) Surface Nitriding Treatment

In this process, a nonmagnetic layer made of a material other than nitride is deposited after magnetic patterns are formed, the surface of the nonmagnetic layer is treated by nitriding, and then the nonmagnetic layer is etched back to flatten the surface.

In the step shown in FIG. 3E, a nonmagnetic layer 34 made of a material selected from the group consisting of single elements, for example, metals such as Ti, V, Cr, Ni, Cu, Ga, Y, Zr, Nb, Mo, Hf, Ta, W and Al and inorganic materials such as C and Si, and alloys and compounds of these elements is deposited. The thickness of the nonmagnetic layer 34 is preferably greater than the height of the protruded magnetic patterns and is preferably about 20 nm to 200 nm. Next, the surface of the nonmagnetic layer 34 is subjected to nitriding treatment. Examples of the method of nitriding treatment include a method in which the nonmagnetic layer 34 is exposed to a nitrogen atmosphere to nitride the surface thereof, a method in which the nonmagnetic layer 34 is kept at high temperatures in a gas such as $NH_3$ or mixed gas containing $NH_3$ to nitride the surface thereof and a method in which the nonmagnetic layer 34 is exposed to a plasma of mixed gas of rare gas and nitrogen to nitride the surface thereof. It is preferable that the nonmagnetic layer 34 be nitrided to a depth ranging from several nanometers to tens of nanometers from the surface. When the nonmagnetic layer 34 is nitrided to the full depth thereof, this is undesirable because nitrogen contained in the nonmagnetic layer 34 brings about deterioration of the magnetic patterns 33a. If the nitriding treatment is carried out at a temperature as high as 250° C. or more, this also causes deterioration of the magnetic patterns 33a and is therefore undesirable.

In the step shown in FIG. 3F, the nonmagnetic layer 34 having a surface nitrided is etched back to flatten the surface. At this time, it is most preferable to stop the etchback just before the magnetic patterns 33a are exposed in consideration of the magnetic spacing. If the magnetic patterns 33a are exposed, this is undesirable because their surfaces are oxidized. As mentioned above, the nonmagnetic layer as the filling material and the protective film are preferably left on the magnetic patterns 33a in a total thickness of 1 nm to 10 nm.

The deposition of the nonmagnetic layer, the surface nitriding treatment of the nonmagnetic layer and the etchback of the nonmagnetic layer may be performed once or repeated plural times. The nitriding treatment may be performed plural times during etchback. If the number of depositions of the nonmagnetic layer, surface nitriding treatments of the nonmagnetic layer and etchback operations of the nonmagnetic layer is increased, it is advantageous in terms of flattening but has a drawback that the risk of dust generation is increased. Therefore, the number of etchback operations is preferably 100 times or less.

(2) Etchback in Nitrogen-Containing Gas

In this process, a nonmagnetic layer is deposited after the magnetic patterns are formed and the nonmagnetic layer is processed by etchback in a nitrogen-containing gas to flatten the surface while nitriding the surface.

In the step shown in FIG. 3E, a nonmagnetic layer 34 made of a material selected from the group consisting of single elements, for example, metals such as Ti, V, Cr, Ni, Cu, Ga, Y, Zr, Nb, Mo, Hf, Ta, W and Al and inorganic materials such as C and Si, and alloys and compounds of these elements is deposited. The thickness of the nonmagnetic layer 34 is preferably greater than the height of the protruded magnetic patterns and is preferably about 20 nm to 200 nm.

In the step shown in FIG. 3F, the nonmagnetic layer 34 is flattened by etchback performed in a nitrogen-containing gas. Specifically, the etchback is performed using an Ar ion milling or an ECR ion gun in a mixture gas of rare gas such as Ar and $N_2$. With regard to the mixing ratio of the rare gas to $N_2$ in the mixture gas, if the ratio of $N_2$ is too high, no etching is attained whereas if the ratio of $N_2$ is too low, the flattening effect is reduced. Therefore, the ratio of $N_2$ in the mixture gas is preferably 5% or more and 70% or less and more preferably 20% or more and 60% or less.

If the deposition of the nonmagnetic layer and the etchback in a nitrogen-containing gas are repeated plural times, this contributes to the flattening of the surface. As mentioned above, the nonmagnetic layer as the filling material and the protective film are preferably left on the magnetic patterns in a total thickness of 1 nm to 10 nm.

(3) Depositions of a Non-Nitride Layer and a Nitride Layer

In this process, a first nonmagnetic layer made of a material other than nitride is deposited after the magnetic patterns are formed, a second nonmagnetic layer containing a nitride is deposited on the first nonmagnetic layer, and the second nonmagnetic layer is etched back to flatten the surface. These processes are described with reference to FIGS. 4A to 4D.

Figure 4A:
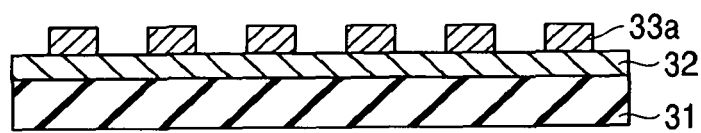
FIGS. 4A to 4D are cross-sectional views showing a method of manufacturing a magnetic recording medium according to another embodiment of the present invention.

FIG. 4A shows the state that the ferromagnetic layer 33 is processed to form magnetic patterns 33a and then the resist 40 is peeled off (corresponding to FIG. 3D).

Figure 4B:
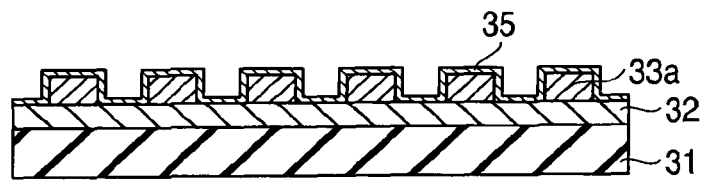

As shown in FIG. 4B, a first nonmagnetic layer 35 made of a material other than nitride is deposited on the entire surface. Besides the materials listed in (1) and (2), metals which are not nitrided may be used for the first nonmagnetic layer 35. Specifically, the material of the first nonmagnetic layer 35 is selected from the group consisting of single elements, for example, metals such as Ti, V, Cr, Ni, Cu, Ga, Y, Zr, Nb, Mo, Hf, Ta, W and Al, metals such as Ru and Pt which are not nitrided, inorganic materials such as C, Si, and SiC, and alloys and compounds of these elements. The first nonmagnetic layer 35 is deposited by a method such as vacuum evaporation, sputtering or CVD. The thickness of the first nonmagnetic layer 35 is preferably 3 nm or more to prevent the diffusion of nitrogen from the second nonmagnetic layer made of a nitride formed thereon. When the thickness of the first nonmagnetic layer 35 is too great, on the other hand, the flattening of the second nonmagnetic layer which is attained by etchback is hindered. Therefore, the thickness of the first nonmagnetic layer is preferably 10 nm or less.

Figure 4C:
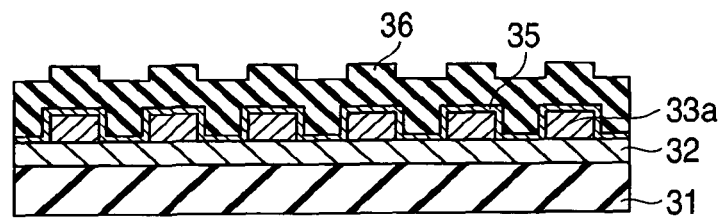

As shown in FIG. 4C, a second nonmagnetic layer 36 containing a nitride is deposited. The second nonmagnetic layer 36 containing a nitride may be deposited by reactive sputtering carried out using a non-nitride target in nitrogen-containing gas, sputtering carried out using a nitride target or sputtering carried out using a non-nitride target followed by surface nitriding treatment. The non-nitride target is made of a material selected from the group consisting of single elements, for example, metals such as Ti, V, Cr, Ni, Cu, Ga, Y, Zr, Nb, Mo, Hf, Ta, W and Al, inorganic materials such as C and Si, and alloys and compounds of these elements. The nitride target is made of a nitride of these materials.

Figure 4D:
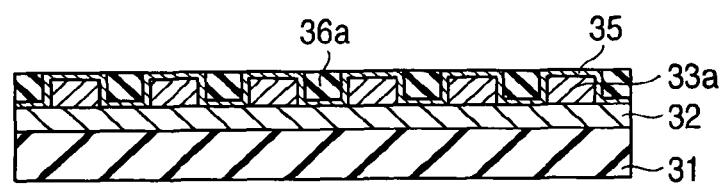

As shown in FIG. 4D, the second nonmagnetic layer 36 is etched back to form a filled layer 36a in the recesses between the magnetic patterns 33a. This etchback may be carried out in a nitrogen-containing gas. The deposition of the second nonmagnetic layer 36 and the etchback of the second nonmagnetic layer 36 may be repeated plural times in the same manner as in (1) and (2) above. As shown in FIG. 4D, all of the first nonmagnetic layer 35 may be left or a part of the first nonmagnetic layer 35 may be etched when the etchback is carrier out. Also, a nonmagnetic layer as the filling material may be left on the magnetic patterns 33a. In this case, the total thickness of the nonmagnetic layer and protective layer on the magnetic patterns 33a is preferably 1 nm to 10 nm.

Next, other materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Ferromagnetic Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are deteriorated, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted.

The coercivity of the perpendicular magnetic recording layer is preferably 237000 A/m (3000 Oe) or more. If the coercivity is less than 237000 A/m (3000 Oe), thermal fluctuation resistance tends to be deteriorated. The perpendicular squareness of the perpendicular magnetic recording layer is preferably 0.8 or more. If the perpendicular squareness is less than 0.8, the thermal fluctuation resistance tends to be deteriorated.

<Protective Layer>

The protective layer is provided for the purpose of preventing corrosion of the perpendicular magnetic recording layer and also preventing the surface of a medium from being damaged when the magnetic head is brought into contact with the medium. Examples of the material of the protective layer include those containing C, $SiO_2$ or $ZrO_2$. In particular, diamond-like carbon (DLC) popular is popularly used as the protective layer because of superior hardness. However, if electric conduction is not achieved on the surface of the medium, DLC cannot be deposited by CVD. In the embodiments of the present invention, it is preferable to use a protective layer containing carbon nitride which can be deposited by sputtering. The thickness of the protective layer is preferably 1 to 10 nm. This is preferable for high-density recording because the distance between the head and the medium (magnetic spacing) can be reduced.

FIG. 5 shows a perspective view of a magnetic recording apparatus (hard disk drive) according to an embodiment of the present invention. The magnetic recording apparatus is provided, in a chassis 70, with the above magnetic recording medium (patterned medium) 71, a spindle motor 72 that rotates the magnetic recording medium 71, a head slider 76 with a magnetic head incorporated therein, a head suspension assembly including a suspension 75 and an actuator arm 74 for supporting the head slider 76, and a voice coil motor (VCM) 77 as an actuator of the head suspension assembly.

The magnetic recording medium 71 is rotated by the spindle motor 72. A magnetic head containing a write head and a read head is incorporated into the head slider 76. The actuator arm 74 is rotatably attached to a pivot 73. The suspension 75 is attached to one end of the actuator arm 74. The head slider 76 is elastically supported via a gimbal incorporated into the suspension 75. The voice coil motor (VCM) 77 is disposed on the other end of the actuator arm 74. The voice coil motor (VCM) 77 generates a torque to the actuator arm 74 around the pivot 73 to control the position of the magnetic head such that the magnetic head is floated above an arbitrary radial position of the magnetic recording medium 71.

EXAMPLES

Example 1

Using the method shown in FIG. 3, a DTR medium was manufactured in the following manner. Protruded magnetic patterns with a height of 20 nm were formed. After that, a Cr layer with a thickness of 100 nm was deposited as a nonmagnetic layer. Etchback of the Cr layer was carried out in a mixed gas of Ar and $N_2$ (50:50) with an ECR ion gun to nitride and flatten the surface of the Cr layer. Deposition of the Cr layer and etchback of the Cr layer were repeated ten times to form a filled layer made of Cr nitride in the recesses between the magnetic patterns.

Thereafter, a protective layer made of carbon nitride was deposited. The medium obtained was subjected to a sliding test, to find that the protective layer had high strength.

Separately, the composition of the filled layer before deposition of the protective layer was analyzed by transmission electron microscope-energy dispersive X-ray analysis (TEM- EDX). The results are shown in FIG. 6. It is found from FIG. 6 that the nitrogen concentration in the filled layer is higher on the surface side than on the substrate side and almost no nitrogen is observed on the side closest to the substrate.

Comparative Example 1

A DTR medium differing in the distribution of nitrogen concentration in the filled layer from that of Example 1 was manufactured in the following manner. Protruded magnetic patterns with a height of 20 nm were formed. After that, a Cr layer with a thickness of 100 nm was deposited as a nonmagnetic layer. Etchback of the Cr layer was carried out in a mixed gas of Ar and $N_2$ (50:50) with an ECR ion gun, to nitride and flatten the surface of the Cr layer. Deposition of the Cr layer and etchback of the Cr layer were repeated nine times. One Cr layer was further deposited, and finally etchback was carried out using only Ar to form a filled layer, the outermost surface of which was not nitrided.

Thereafter, a protective layer made of carbon nitride was formed. The medium obtained was subjected to a sliding test, to find that many scratches were generated on the surface. When the surface was observed with a microscope, peeling of carbon nitride was seen. This is because the adhesion of the filled layer to carbon nitride was deteriorated since the surface of the filled layer was not nitrided.

Separately, the composition of the filled layer before deposition of the protective layer was analyzed by TEM-EDX. The results are shown in FIG. 7. As shown in FIG. 7, since the etchback was carried out in the $N_2$ mixture gas except for the final etchback, naturally oxidized Cr (i.e., O and Cr) was observed on the outermost surface and N and Cr were observed much in the central region.

Example 2

Using the method shown in FIG. 3, a DTR medium was manufactured in the following manner. Protruded magnetic patterns with a height of 20 nm were formed. After that, a Cr layer with a thickness of 30 nm was formed as a nonmagnetic layer. Etchback of the Cr layer was carried out in a mixed gas of Ar and $N_2$ (50:50) with an ECR ion gun, to nitride and flatten the surface of the Cr layer. Deposition of the Cr layer and etchback of the Cr layer were repeated ten times to form a filled layer made of Cr nitride in the recesses between the magnetic patterns. The surface area of 2 µm×2 µm was observed with an atomic force microscope (AFM), to find that smooth undulation was observed.

Comparative Example 2

A DTR medium differing from that of Example 2 in that the filled layer contained no nitride was manufactured in the following manner. Protruded magnetic patterns with a height of 20 nm were formed. After that, a Cr layer with a thickness of 30 nm was deposited as a nonmagnetic layer. Etchback of the Cr layer was carried out in a pure Ar gas with an ECR ion gun, to flatten the Cr layer. Deposition of the Cr layer and etchback of the Cr layer were repeated ten times to form a filled layer made of Cr nitride in the recesses between the magnetic patterns. The surface area of 2 µm×2 µm was observed with AFM, to find that the surface was roughened.

Table 1 summarizes the surface roughness Ra [nm] of each medium obtained in Example 2 and Comparative Example 2. It is understood that when the etchback of the Cr layer is carried out in a pure Ar gas to form a filled layer made of a non-nitride as shown in Comparative Example 2, the surface is roughened every time when the etchback is repeated. On the other hand, it is also understood that, when the etchback of the Cr layer is carried out in a nitrogen-containing gas to form a filled layer made of a nitride as shown in Example 2, the surface can be flattened while reforming the surface.

TABLE 1

| Number of repetitions of deposition and etchback | Example 2 Ra of Cr nitride layer [nm] | Comparative Example 2 Ra of Cr layer [nm] |
|---|---|---|
| 1 | 3.5 | 5.7 |
| 10 | 0.9 | 12.8 |

Example 3

Presence or Absence of a Non-Nitride Layer

Using the method shown in FIG. 4, a DTR medium was manufactured in the following manner. Protruded magnetic patterns with a height of 20 nm were formed. After that, a Cr layer with a thickness of 5 nm was deposited as a first nonmagnetic layer. Next, reactive sputtering was carried out using a Cr target in a sputtering gas of $N_2$ and Ar (flow rate; $N_2$:Ar=15:85) to form a Cr—N layer with a thickness of 30 nm as a second nonmagnetic layer. Then, etchback of the second nonmagnetic layer was carried out with an ECR ion gun, to flatten the surface. Deposition of the Cr—N layer and etchback of the Cr—N layer were repeated ten times to form a filled layer made of Cr—N in the recesses between the magnetic patterns.

Next, a carbon nitride protective layer was deposited and a lubricant was applied. The medium obtained was incorporated into a hard disk drive to measure on-track SNR. As a result, a value of 13.5 dB was obtained.

Separately, the composition of the filled layer before deposition of the protective layer was analyzed by TEM-EDX. The results are shown in FIG. 8. It is found from FIG. 8 that a Cr layer with a thickness of about 5 nm exists on the lowermost part of the filled layer and a Cr—N layer containing almost constant composition of N is formed on the Cr layer.

Comparative Example 3

A DTR medium differing from that of Example 3 in that the filled layer did not contain the first nonmagnetic layer made of a non-nitride was manufactured in the following manner. Protruded magnetic patterns with a height of 20 nm were formed. After that, without forming a Cr layer as the first nonmagnetic layer, reactive sputtering was carried out using a Cr target in a sputtering gas of $N_2$ and Ar (flow rate; $N_2$:Ar=15:85) to form a Cr—N layer with a thickness of 30 nm. Then, etchback of the Cr—N layer was carried out with an ECR ion gun, to flatten the surface. Deposition of the Cr—N layer and etchback of the Cr—N layer were repeated ten times to form a filled layer made of Cr—N in the recesses between the magnetic patterns.

Next, a carbon nitride protective layer was deposited and a lubricant was applied. The medium obtained was incorporated into a hard disk drive to measure on-track SNR. As a result, a value of 10.3 dB was obtained. This example was lower in SNR by 3.2 dB than Example 3. The reason is considered that deterioration of magnetic patterns was caused by the deposition of Cr—N layer, since the first nonmagnetic layer made of a non-nitride was not formed.

Separately, the composition of the filled layer before deposition of the protective layer was analyzed by TEM-EDX. The results are shown in FIG. 9. It is found from FIG. 9 that the filled layer is made of a Cr—N layer containing almost constant composition of N except that the content of O on the surface is large.

Example 4

Using the method shown in FIG. 3, a DTR medium was manufactured in the following manner. Protruded magnetic patterns with a height of 20 nm were formed. After that, a Cr layer with a thickness of 100 nm was formed as a nonmagnetic layer. Next, etchback of the Cr layer was carried out with an ECR ion gun in a mixture gas of Ar and $N_2$ (flow rate; Ar:$N_2$=50:50) to nitride and flatten the surface of the Cr layer to form a filled layer made of Cr nitride in the recesses between the magnetic patterns (deposition and etchback were not repeated).

The medium obtained was incorporated into a hard disk drive to measure the vibration of the head by using a laser Doppler vibrometer (LDV). As a result, the flying height of the head dropped by about 0.7 nm at the maximum.

Also, protruded magnetic patterns with a height of 20 nm were formed. After that, a Cr layer with a thickness of 100 nm was formed as a nonmagnetic layer. Next, etchback of the Cr layer was carried out with an ECR ion gun in a mixture gas of Ar and $N_2$ (flow rate; Ar:$N_2$=50:50) to nitride and flatten the surface of the Cr layer. Deposition and etchback of the Cr layer were repeated ten times to form a filled layer made of Cr nitride in the recesses between the magnetic patterns.

The medium obtained was incorporated into a hard disk drive to measure the vibration of the head by using LDV. As a result, the flying height of the head dropped by about 0.5 nm at the maximum.

In the medium manufactured without forming any filled layer, on the other hand, the flying height of the head dropped by about 1.0 nm at the maximum.

It is understood from these results that if the deposition and etchback of the nonmagnetic layer are carried out at least one time to form a filled layer, the drop of the head is decreased and therefore flying stability of the head is obtained. If the deposition and etchback of the nonmagnetic layer are carried out ten times to form a multilayer filled layer, the drop of the head is further decreased, so that an excellent HDD medium is provided.

Example 5

A DTR medium was manufactured in the same manner as in Example 4 except that a material other than Cr was used as the nonmagnetic layer. The material used for the nonmagnetic layer was C, Si, Ti, V, Ni, Cu, Ga, Y, Zr, Nb, Mo, Hf, Ta, W or Al. Also, protruded magnetic patterns with a height of 20 nm were formed. After that, a nonmagnetic layer with a thickness of 100 nm was deposited using each of the materials above. Next, etchback of the nonmagnetic layer was carried out with an ECR ion gun in a mixture gas of Ar and $N_2$ (flow rate; Ar:$N_2$=50:50) to nitride and flatten the surface of the nonmagnetic layer. Deposition and etchback of the nonmagnetic layer were repeated ten times to form a filled layer made of nitride in the recesses between the magnetic patterns.

The medium obtained was incorporated into a hard disk drive to measure the vibration of the head by using LDV. As a result, it was confirmed that any of these mediums was more decreased in the drop of the head than the mediums in which the filled layer was not formed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a magnetic recording medium comprising:
    depositing a soft magnetic layer on a substrate;
    depositing a ferromagnetic layer on the soft magnetic layer, followed by patterning the ferromagnetic layer to form magnetic patterns separated from each other;
    forming a nonmagnetic layer between the magnetic patterns; and
    forming a protective layer, comprising carbon nitride, on the magnetic patterns and the nonmagnetic layer,
    the nonmagnetic layer comprising a nitride of a first element selected from the group consisting of Si, Ti, V, Cr, Ni, Cu, Ga, Y, Zr, Nb, Mo, Hf, Ta, W, and Al and an alloy thereof and having a nitrogen concentration higher on a surface side than on a substrate side, the first element being distributed over the entire thickness of the nonmagnetic layer.

2. The method according to claim 1, comprising:
    depositing a nonmagnetic layer made of a material other than a nitride after the magnetic patterns are formed;
    nitriding a surface of the nonmagnetic layer; and
    etching back the nonmagnetic layer for flattening.

3. The method according to claim 2, wherein the deposition of the nonmagnetic layer, the surface nitriding of the nonmagnetic layer and the etchback of the nonmagnetic layer are repeated multiple times.

4. The method according to claim 1, comprising:
    depositing a nonmagnetic layer after the magnetic patterns are formed; and
    etching back the nonmagnetic layer in a nitrogen-containing gas for flattening while nitriding a surface of the nonmagnetic layer.

5. The method according to claim 4, wherein the deposition of the nonmagnetic layer and the etchback of the nonmagnetic layer in a nitrogen-containing gas are repeated multiple times.

6. The method according to claim 1, comprising:
    depositing a first nonmagnetic layer made of a material other than a nitride after the magnetic patterns are formed;
    depositing a second nonmagnetic layer containing a nitride on the first nonmagnetic layer; and
    etching back the second nonmagnetic layer for flattening.

7. The method according to claim 6, wherein the second nonmagnetic layer is deposited by sputtering using a non-nitride target in a nitrogen-containing gas, sputtering using a nitride target, or sputtering using a non-nitride target followed by surface nitriding.

8. The method according to claim 6, wherein the deposition of the second nonmagnetic layer and the etchback of the second nonmagnetic layer are repeated multiple times.

9. The method according to claim 6, wherein the etchback is carried out in a nitrogen-containing gas.

* * * * *